United States Patent

Higgs

[15] 3,668,677
[45] June 6, 1972

[54] ALARM SYSTEM FOR CONSISTOMETER

[72] Inventor: Kenneth O. Higgs, Port Neches, Tex.
[73] Assignee: Texaco Inc., New York, N.Y.
[22] Filed: Dec. 30, 1970
[21] Appl. No.: 102,690

[52] U.S. Cl. .............................. 340/236, 73/59, 340/248 P
[51] Int. Cl. ........................................................ G08b 21/00
[58] Field of Search ................. 340/236, 268, 271, 248 P; 137/4, 92; 73/59, 136 A; 317/5; 307/232

[56] References Cited

UNITED STATES PATENTS

| | | | |
|---|---|---|---|
| 3,181,348 | 5/1965 | Lewis | 73/59 X |
| 3,545,265 | 12/1970 | McIlraith et al. | 73/136 A |
| 3,589,178 | 6/1971 | Germann | 73/136 A |

Primary Examiner—John W. Caldwell
Assistant Examiner—Daniel Myer
Attorney—Thomas H. Whaley, Carl G. Ries and Robert J. Sanders, Jr.

[57] ABSTRACT

An alarm system for indicating whether or not a valid signal is being recorded, as distinguished from spurious signals occurring outside of selected time intervals when valid signal information should normally be passed through a noise gate. The alarm circuit comprises an exclusive-OR circuit having its respective input terminals coupled to opposite sides of the noise gate for providing an alarm pulse at its output only when a spurious signal is applied to the input of the noise gate at times when it is not passed through the gate. The output of the exclusive-OR circuit is coupled to the set input of an alarm latch circuit comprising a bistable multivibrator for producing an output signal which is employed to activate an indicator. The output of the noise gate is also coupled to the reset input of the alarm latch circuit in order to reset the alarm circuit automatically when normal signal pulses are passed through the noise gate. It applies to consistometer apparatus of the type wherein the consistency of a stream of material such as grease is measured by measuring the deflection of a flexible resilient member located in the stream and rotated at a constant rate about an axis which is parallel to the direction of flow of the stream by measuring any time delay of the resilient member due to such deflection as compared to a rigid reference member rotated in synchronism with the resilient member. Means are provided for periodically detecting the resilient member and rigid reference member as they are rotated past respective magnetic sensors. Means are coupled to the respective magnetic sensors for generating respective electric pulses, the first of which has a leading edge corresponding to the time when the reference member crosses the center of the reference sensor, and the second of which has a leading edge corresponding to the time when the resilient detector member crosses the center of the detector sensor. The first pulse is supplied through a noise gate to the set input of an RS flip-flop circuit for initiating a third pulse and the second pulse is supplied to the reset input of the RS flip-flop for terminating the third pulse after a time duration corresponding to the interval between the respective leading edges of the first and second pulses. The noise gate is controlled by a latch circuit having its set and reset inputs coupled to means including the reference and detector sensors, respectively, for controlling the gate so that it passes pulses to the set input of the RS flip-flop only during selected time intervals when the rotating members are in the vicinity of their respective sensors.

11 Claims, 3 Drawing Figures

ALARM SYSTEM FOR CONSISTOMETER

FIELD OF THE INVENTION

This invention relates to alarm systems for indicating whether or not a valid signal is being obtained, as distinguished from spurious signals; and, more particularly, it is directed to improvements in apparatus for producing an alarm signal when such spurious signals occur outside of selected time intervals when valid signal information should be passed through a noise gate, and it is particularly concerned with consistometer apparatus embodying such alarm systems.

BACKGROUND OF THE INVENTION

Apparatus has been developed for providing a continuous measure of consistency but, for the most part, such apparatus depends upon maintaining a constant flow of the material whose consistency is being measured. Apparatus capable of functioning to provide an accurate measure of the consistency of material flowing in a stream has been developed wherein a flexible member is rotated in the stream about an axis substantially parallel to the direction of flow of the material in the stream and the reaction forces exerted on the flexible member by the material are measured as a measure of the consistency of the material. U.S. Pat. No. 3,402,729, issued Sept. 24, 1968 to Richmond et al., discloses apparatus of this type wherein the reaction forces on such a flexible member are measured by means of strain gauges associated with the flexible member for providing a signal proportional to its deflection. While such apparatus is quite satisfactory for measuring the consistency of many materials, such as greases, certain other materials, such as water-based greases, are likely to have an adverse effect on the electrical structure of the strain gauges and, also, are likely to provide problems wherein such strain gauges are coupled to electrical measuring circuits outside of the consistometer by means of slip rings.

The present invention is concerned with an alarm circuit for consistometer apparatus wherein the amount of deflection of a flexible member mounted for rotation in a flowing stream of material, such as grease, is determined by means of a reference member mounted for rotation in synchronism with the resilient member, together with means for periodically detecting the relative positions of the resilient member and the reference member as the resilient member is rotated in the stream of material. An electric circuit is coupled to respective sensor means, preferably shown as magnetic sensors, for measuring any time difference between the passage of the reference member and the resilient member in order to measure the deflection of the resilient member in the material. In a preferred embodiment the circuit for making the time interval measurement includes means for generating first and second electric pulses corresponding to the respective times when the reference member and flexible member pass their respective sensors, together with means for producing a third pulse corresponding to the time interval between the first and second electric pulses. This circuit includes a noise gate for selectively transmitting the first electric pulse to the means for producing the third pulse and the noise gate, in turn, is controlled by a circuit for selectively opening the gate to pass pulses only during selected time intervals when the rotating members are in the vicinity of their respective sensors.

A consistometer system involving measurement of the deflection of a resilient member in the manner described in the preceding paragraph is described and claimed in an application for U.S. Patent filed Dec. 10, 1971 by the present applicant Higgs, as co-inventor with Richmond and Marsch, Ser. No. 206,717.

One problem associated with circuits employing such noise gates is that they operate so smoothly that it is not always possible to tell with assurance whether or not the output signal represents a proper consistency measurement or whether it may be the result of the circuit being responsive to some prior valid signal. Accordingly, the present invention is directed to an alarm system for providing an indication when spurious signals are generated by the consistometer outside of the time when the noise gate is opened to transmit pulses to the circuit for producing the third pulse corresponding to the time interval between the respective pulses produced by the sensors responding to the respective reference and flexible members.

SUMMARY OF THE INVENTION

Briefly stated, the present invention relates to an alarm system for indicating whether or not a valid signal is being recorded, as distinguished from spurious signals occurring outside of selected time intervals when valid signal information should normally be passed through a noise gate. The alarm circuit comprises an exclusive-OR circuit having its respective input terminals coupled to opposite sides of the noise gate for providing an alarm pulse at its output only when a spurious signal is applied to the input of the noise gate at times when it is not passed through the gate. The output of the exclusive-OR circuit is coupled to the set input of an alarm latch circuit for producing an output signal which is employed to activate an indicator. The output of the noise gate is also coupled to the reset input of the alarm latch circuit in order to reset the alarm circuit automatically when normal signal pulses are passed through the noise gate.

In a preferred embodiment the alarm system is employed in a circuit for measuring a time interval delineated by first and second electric pulses, wherein the first pulse is supplied through a noise gate to the set input of an RS flip-flop circuit for initiating a third pulse, and the second pulse is supplied to the reset input of the RS flip-flop for terminating the third pulse after a time duration corresponding to the time interval between the respective leading edges of the first and second pulses.

Preferably, the alarm circuit is employed in a novel combination with a consistometer apparatus of the type wherein the consistency of a stream of material such as grease is measured by measuring the deflection of a flexible resilient member located in the stream and rotated at a constant rate about an axis which is preferably parallel to the direction of flow of the stream by measuring any time delay of the resilient member due to such deflection as compared to a rigid reference member rotated in synchronism with the resilient member. Means are provided for periodically detecting the resilient member and reference member as they are rotated and for generating respective electric pulses which are supplied to the aforementioned circuit for measuring the time interval delineated by the first and second electric pulses.

In a preferred embodiment, the noise gate is controlled by a latch circuit having its set and reset inputs coupled to means including the reference and detector sensors, respectively, for controlling the gate so that it passes pulses to the set input of the RS flip-flop only during selected time intervals when the rotating members are in the vicinity of the respective sensors.

DETAILED DESCRIPTION OF THE PREFERRED EMBODIMENT OF THE INVENTION

Figure 1:
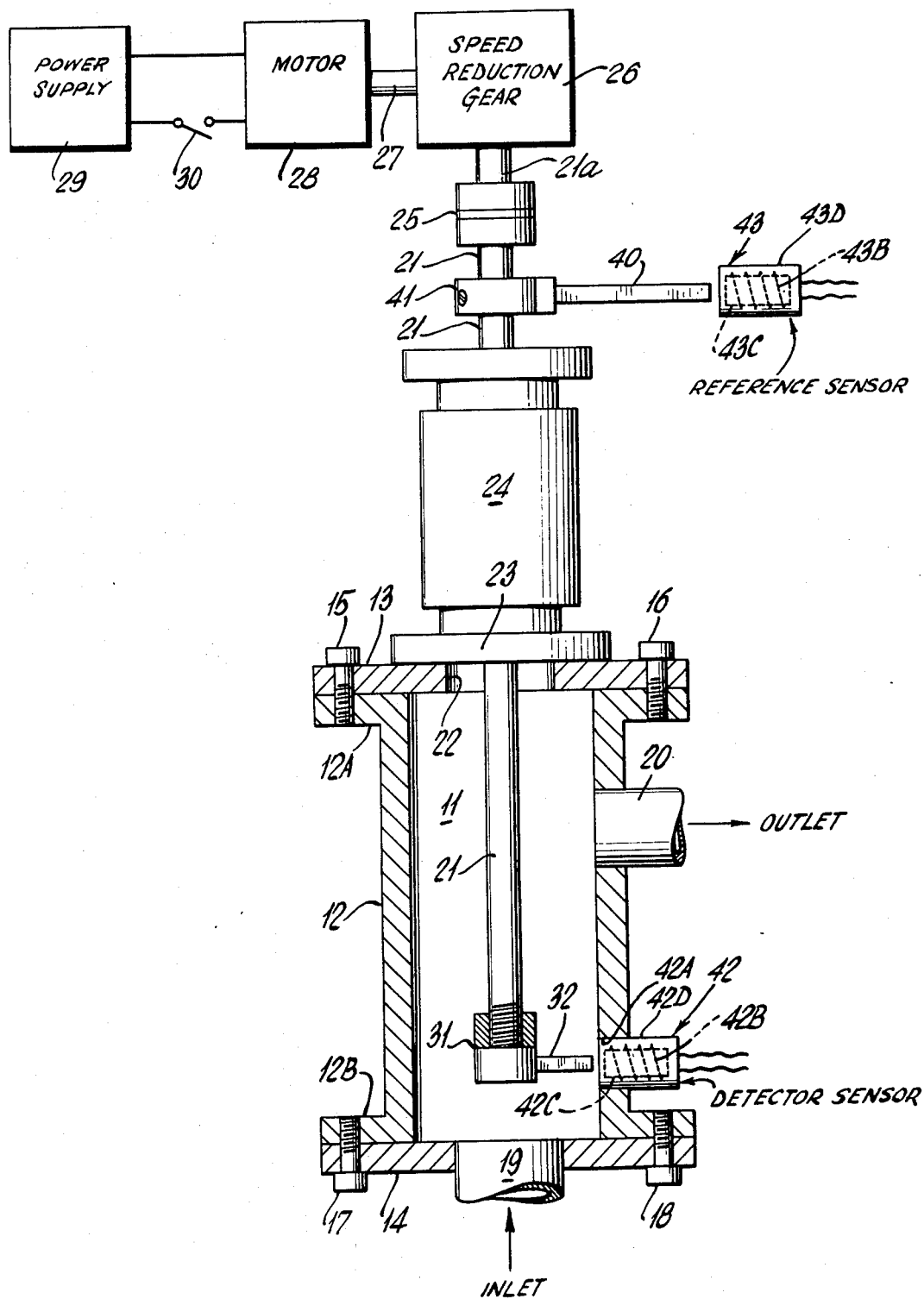
FIG. 1 is a longitudinal view, partly in cross-section, partly in block form, showing consistometer apparatus in accordance with the invention including a measuring chamber containing a rotatable resilient member mounted for rotation on a shaft extending therein from a drive means and having mounted thereon a rigid reference member outside the chamber for rotation therewith, together with appropriate detector means mounted opposite the respective resilient and reference members.

Referring now to FIG. 1, there is shown a consistometer apparatus embodying features of the present invention, wherein a chamber 11 is defined by tubular side walls 12 of appropriate steel or other material suitable to maintain the grease or other material whose consistency is to be measured and having upper and lower end plates 13, 14 bolted to respective upper and lower flanges 12A, 12B on the chamber member 12 by means of bolts 15, 16, 17, 18. At the lower end of the chamber 11, in the lower end plate 14, there is provided an opening for receiving an inlet conduit 19 through which material, such as grease, the consistency of which is to be measured, may be introduced under appropriate pressure in a continuous stream. An outlet conduit 20 is provided at an upper portion of the sidewall 12 of the chamber 11 for outputting a stream of the material passing through the chamber 11 for consistency measurement. Directly above the inlet conduit 19, axially alligned therewith, there is provided a shaft 21 extending into the chamber 11 through an opening 22 in the upper plate 13 from a stuffing box arrangement 23 containing appropriate means for sealing fluid within the chamber under appropriate pressure from bearings (not shown) in a bearing assembly 24 through which the shaft 21 extends upwardly to a mechanical coupling 25 from whence it is driven by means of a speed reduction gear 26 which, in turn, is coupled by means of a drive shaft 27 to an electric motor 28. The electric motor 28 provides means for driving the shaft 21 at a constant speed and is, in turn, electrically coupled to a suitable power supply 29 through appropriate conductors including a switch 30.

The lower end of the shaft 21 within the chamber 11 has affixed thereto a mounting assembly 31, shown threaded to the lower end of the shaft 21, for attaching a resilient reference blade member 32 to the shaft 21. The blade 32 is mounted to the shaft 21 so that the two surfaces about which it is flexible are parallel to the direction of the flow of the material in the stream passing upwardly from the inlet 19 through the chamber 11 and thence out through the outlet 20. The shaft 21 including the assembly 31 and resilient member 32 mounted thereon are rotated at a constant rate as the material being measured is passed through the chamber 11 in the direction of the arrow shown below the inlet 19 in the drawing. The blade 32 may be formed of steel capable of deflection in the material being measured, such as grease, and the end of the blade will be deflected as it rotates in the material by an amount dependent upon the reaction forces exerted thereon by the material as an indication of the consistency of such material.

Means are provided for substantially continuously measuring the amount of deflection or flexure of the resilient member 32 as a measure of the consistency of the material passing through the chamber 11.

In accordance with novel features of the present invention, means are provided for measuring the deflection of the resilient member 32 as material flows through the chamber 11 and as the member 32 is rotated in such flowing material, without introducing electrical connections into the chamber 11 to the member 32. This is accomplished in accordance with a preferred aspect of the present invention by the provision of a reference member 40 mounted on the shaft 21 by means of a mounting assembly 41 which may be in the form of a collar having an appropriate set screw therein for facilitating adjustment of the position of the member 40 on the shaft 21 relative to the position of the resilient member 32 on the shaft 21, as will be discussed in further detail hereinafter. It will be seen from the above that the resilient member 32 and the relatively rigid member 40, both being mounted to the same shaft 21, will rotate in synchronism as the shaft is rotated by the motor 28.

In a preferred embodiment the resilient member 32 and the relatively rigid reference member 40 are mounted to the shaft 21 so that they lie in substantially the same plane as the central axis of the shaft 21 when the resilient member 32 is in its normal position, i.e., not subjected to forces tending to deflect same. The reference and the "resilient" members may also lie in a different plane, but such is not necessary.

When the shaft 21 is rotated in a stream of material, such as grease, reaction forces of such material upon the resilient member 32 will cause it to be deflected to an extent dependent upon the consistency of such material. Such deflection will tend to move the end of the member 32 out of the aforementioned common plane by an amount dependent upon the consistency of the material. Means are provided for measuring this deflection of the member 32 comprising a first detector or sensor, referred to as the detector sensor 42, opposite the resilient member 32, and a second detector or sensor, referred to as the reference sensor 43, opposite the rigid member 40. These two sensors 42 and 43 preferably comprise magnetic sensors responsive to the passage of the respective blades 32 and 40. By measuring the time difference between the passage of the two blades 32 and 40 relative to their respective magnetic sensors 42 and 43, it is possible to determine the amount of deflection of the blade 32 in the material passing through the chamber 11 as a means for measuring the consistency thereof. Such time differences can be measured by the use of appropriate electrical circuitry as described in further detail hereinafter, with particular reference to FIG. 2.

It is to be noted that, in the preferred embodiment, the two sensors 42, 43 advantageously comprise respective magnetic sensors mounted within relatively rugged shells or housings formed of stainless steel or the like to withstand the conditions and materials encountered within the chamber 11 as the stream of material being measured passes through. The first or detector sensor 42 is shown mounted within an opening 42A in the wall 12 of the chamber 11, whereby the magnetic sensor is able to detect the flexible detector blade 32 magnetically, without itself being placed within the material passing through the chamber 11. The second or reference sensor 43 is mounted through the use of appropriate means (not shown) for maintaining it opposite the rigid reference blade member 40 so that the reference sensor 43 may sense or detect the reference member 40 magnetically as it moves past same. Advantageously, the magnetic sensor of the second detector 43 may also be mounted within a casing of stainless steel or the like similar to that employed for enclosing the first magnetic sensor 42.

It will be appreciated that the rigid reference member 40 is shown mounted to the shaft 21 at a location outside of the chamber 11. This is the preferred embodiment, since it permits adjustment of the reference blade. It also avoids introducing any unnecessary turbulence or shearing action in the material within the chamber 11 which might adversely influence the measurement obtained by deflection of the flexible member 32. However, it is possible to construct apparatus of the type herein disclosed wherein the rigid reference member 40 is mounted to a portion of the shaft 21 within the chamber 11. In such event, the rigid member 40 should be affixed to the shaft at a position downstream from the flexible blade (above the flexible blade 32, as shown in FIG. 1) a sufficient distance to avoid producing any adverse effect on the consistency of the material flowing through the chamber 11 prior to its passing the flexible member 32. In a further embodiment, as described in detail hereinafter, the reference member may comprise a nonmagnetic disc with a magnetic inset, in which event the likelihood of turbulence within the chamber 11 is substantially eliminated.

In the event that the reference member 40 should be positioned within the chamber 11, it may be desirable to provide a longer chamber 11 than otherwise so that the reference member 40 can be spaced beyond the position where it might otherwise influence the consistency of the material whose consistency being measured by the flexible member 32. In the latter event, the second or reference sensor 43 should be positioned within an opening in the side wall 12 of the chamber 11 in a manner similar to the positioning of the first detector and may advantageously be positioned between the location of the outlet 20 and the upper end of the chamber 11 as shown in FIG. 1.

It is to be appreciated that the member 32 is here described as flexible in comparison to the rigid reference member 40. It is to be understood that the rigidity of the member 40 is a relative term when mounted outside of the chamber 11 so that the member 40 rotates in the surrounding air, it will not need to be so rigid as when positioned within the chamber 11 for rotating in the material being measured as discussed above.

It is also to be appreciated that although the flexible member 32 and the reference member 40 are shown positioned in the same plane, it is possible to position the two members in different planes displaced around the axis of the shaft 21 or otherwise mount same for rotation in synchronism, so long as the two sensors are positioned opposite the respective members such that when there is no material in the chamber 11 or when the resilient detector member is stationary in the material in the chamber 11, the two members are in phase at their zero points, namely, the flexible member 32 and the rigid member 40 are both opposite the center of respective sensors 42, 43 at the same time such that when rotated in flowing material under operating conditions the flexible member 32 will be deflected from the corresponding rotational point of the reference member 40 by an amount that is measurable by means of the respective detectors 42, 43 for determination of the amount of flexure of the blade 32 due to the consistency of the material passing through the chamber 11.

It will be appreciated that the apparatus herein disclosed offers advantages over apparatus where electronic portions thereof are mounted within the chamber wherein the consistency measurement is made as, for example, in those types of apparatus where strain gauges are employed on a resilient member as in the above-referenced patent. Among the advantages is the ability to measure the consistency of streams of material, such as water-based greases, which would otherwise adversely influence the electrical measurements or integrity of the electrical components of their encapsulation. Thus, the present apparatus is quite useful in determining the consistency of water-based greases such as cup greases and the like.

Figure 2:
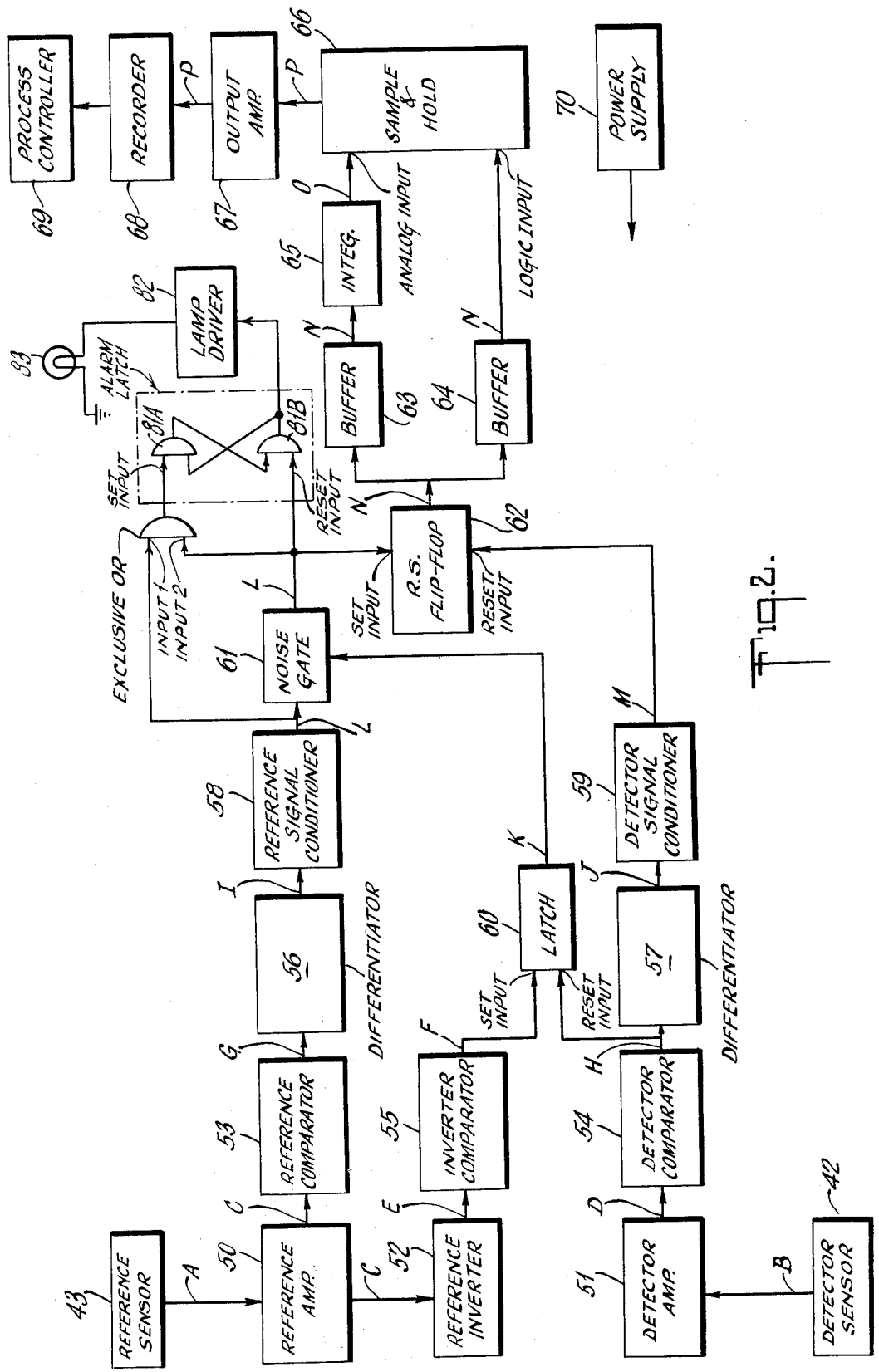
FIG. 2 is a block diagram illustrating schematically an electric circuit for measuring any displacement of the resilient member relative to the rigid reference member of FIG. 1 as they travel past their respective detectors.

Referring now to FIG. 2, there is shown a schematic drawing of electrical circuitry adapted for measuring the deflection of the flexible detector blade 32 relative to the rigid reference blade 40 as the two blades are rotated simultaneously at a constant rate past respective magnetic sensors 42, 43. In particular, as the shaft rotates, the two blades pass through the magnetic field of their respective magnetic sensors at exactly the same time when the instrument is set up without material of measurable consistency in the chamber 11, e.g., with air in the chamber 11. As each of the two blades approaches the respective sensor, an electric current is generated in the coil of the sensor which changes in polarity as the blade crosses the face of the sensor. When the blade crosses the center of the respective sensor the current crosses the zero axis. In this manner the zero crossing point of the electric current marks the exact center of each magnetic sensor.

As grease or other material being measured flows in through the inlet of the chamber 11 and flows past the rotating flexible detector blade member, it is deflected in proportion to the consistency of the grease and the zero crossing of the detector blade past detector 42 is no longer coincident with the crossing of the reference blade past the reference sensor 43. The amount of separation between the two zero crossing points corresponds to the difference in the times when the two blades pass the center or midpoint of their respective sensors and is proportional to blade deflection of the flexible blade which, in turn, is proportional to the consistency of the grease or other material flowing through the chamber 11.

The apparatus shown in FIG. 2 is suitable for measuring the amount of separation between the zero crossing points of the detector and reference blades 32, 40 past the centers of their respective magnetic sensors 42, 43. The apparatus illustrated in FIG. 2 will be discussed with reference to the signal wave forms shown in FIG. 3, which are identified with reference letters corresponding to reference letters at locations on the circuit diagram of FIG. 2 where such signal wave forms appear.

Figure 3:
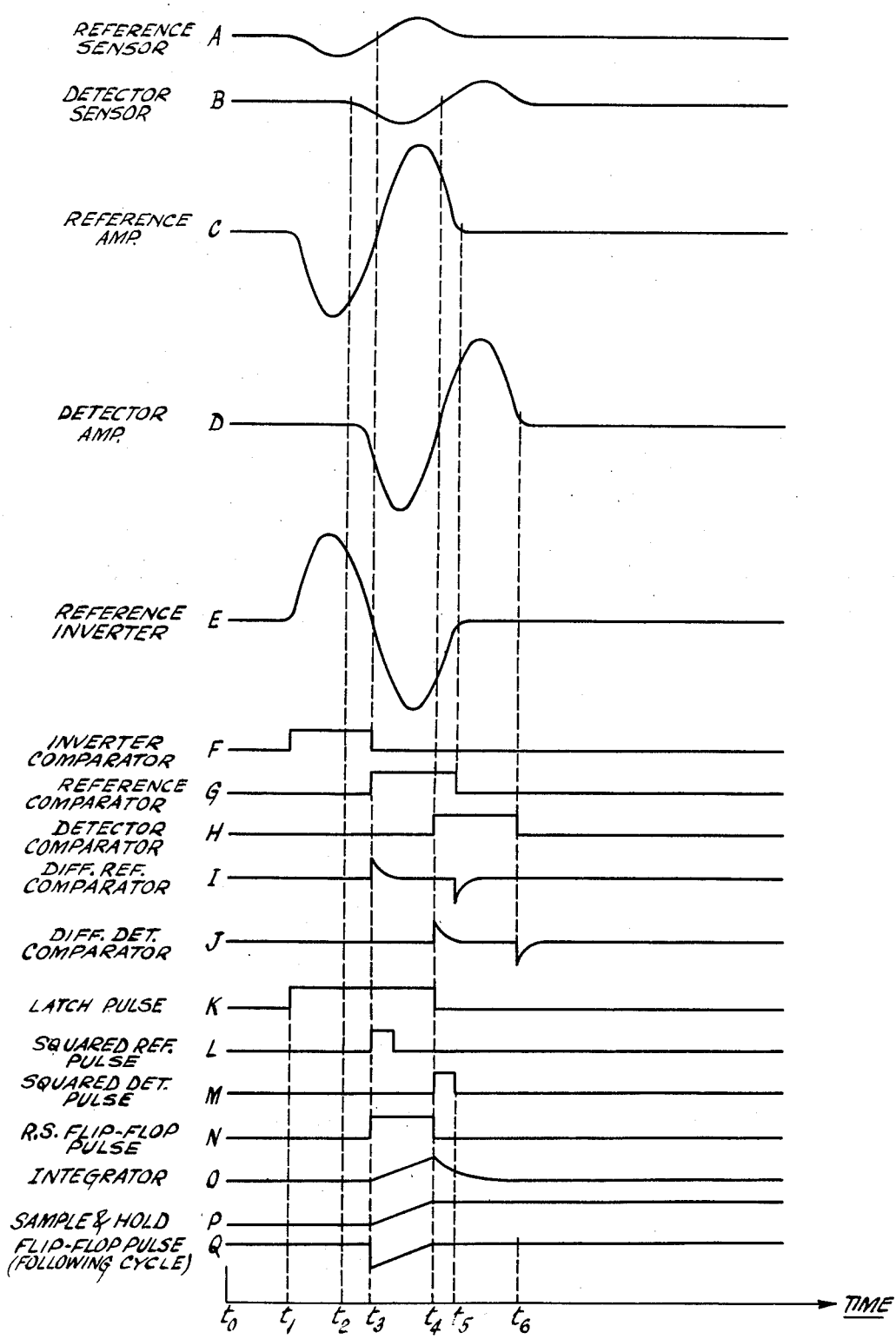
FIG. 3 is a graphic illustration showing the wave form of various signals appearing at various parts of the circuit shown in FIG. 2, as described in further detail hereinafter.

In FIG. 3 the detector sensor 42 and reference sensor 43 provide output signals through the generation of electric currents when the corresponding blade member moves past the respective sensor as discussed above. The outputs of the two magnetic sensors 43, 42 are shown graphically in FIG. 3 as the curves A and B, respectively. All of the curves plotted in FIG. 3 are shown along a common time base $t$, beginning from a time interval $t_0$, which represents a time prior to the arrival of the reference or sensor blades within the magnetic field of the respective sensor as the two blades are rotated in accordance with the invention. As the blade approaches its respective magnetic sensor, an electric current is generated in the sensor which is initially negative and which changes in polarity as the blade passes across the magnetic sensor so that the zero crossing point of the wave form corresponds to the time when the blade passes across the precise center of the sensor. Thus, in FIG. 3 the time $t_1$ represents the beginning of the generation of an electric current as the reference blade 40 begins to cut the field of the reference sensor 43. Likewise, the time $t_2$ represents the time when the detector sensor 42 begins to generate an electric signal B as the detector blade 32, delayed by the material in the chamber 11, begins to pass across its respective magnetic sensor 42. The time interval $t_3$ represents the zero crossing time when the electric signal A passes through its midpoint, representing passage of the reference blade 40 across the midpoint of its magnetic sensor 43. Likewise, the time interval $t_4$ represents the zero crossing time at which the detector blade 32 passes the center of its magnetic sensor 42. In accordance with the preferred aspect of the invention as herein disclosed, the circuit illustrated in FIG. 3 operates to provide an output signal corresponding to the time interval between the two zero crossing times $t_3$ and $t_4$ when the reference and detector blades cross the midpoints of their respective sensors. This is accomplished as follows:

The outputs of the respective reference and detector sensors 43, 42, in the form of the signals A and B, are supplied to respective Reference and Detector Amplifiers 50, 51, both of which are linear amplifiers for amplifying the output signals A and B of the respective sensors 43, 42 without changing their wave form and particularly without changing the relative positions of the zero crossing points $t_3$, $t_4$ of the two signal waves A, B. Thus, the linear amplifiers 50, 51 provide output signals corresponding to the wave forms C and D shown in FIG. 3 which are amplified versions of the signals A and B. The output of the Reference Amplifier 50 is also coupled to a Reference Inverter 52, the function of which is to invert the phase of the incoming signal A applied thereto and amplify same, without otherwise changing its wave form. The output of the Reference Inverter 52 is shown in FIG. 3 as the wave form E, which is an inverted version of the wave form C, but otherwise the same. Thus, the Reference Inverter 52 is essentially a linear amplifier operated in the phase-inverting mode.

The three signals C, D, E are then supplied to respective Comparators 53, 54, 55. Each of the Comparators 53, 54, 55 is characterized by providing an abrupt change of state upon receipt of a positive-going signal. Thus, the three Comparators provide output signals corresponding to the square wave forms F, G, and H in FIG. 3. The leading edges of the relatively square wave signals from the Reference and Detector Comparators 53, 54, shown as wave forms G and H, accurately mark the zero crossing points of the signals from the respective magnetic sensors as indicated by the zero crossing points of signals A and B at times $t_3$ and $t_4$, respectively. The leading edge of the wave form F provided by the Inverter Comparator 55 corresponds to the time interval $t_1$ and will be discussed hereinafter.

The output pulses from the Reference and Detector Comparators, shown as wave forms G and H, respectively, are supplied to respective Differentiator circuits 56, 57 to provide differentiated reference and detector signals I and J, respectively, which, in turn, are supplied to respective Signal Conditioners 58, 59. The Signal Conditioners 58, 59 function to clip off the negative-going portions of the input signals I and J, thus eliminating the negative-going spikes of wave forms I and J and producing positive-going pulses L and M, corresponding to the positive-going pulses L and M, corresponding to the positive-going spikes of the wave forms I and J, respectively. Thus, the output response of the Signal Conditioners 58, 59 are shown as the squared reference and detector pulses L and M, the leading edges of which correspond to the leading edges of the respective positive-going spikes of the differentiated signals I and J. It is noted that the leading edges of these positive-going square reference and detector pulses L and M correspond, respectively, to the time intervals $t_3$ and $t_4$ of the zero crossing points of signals A and B. In one embodiment of the invention the positive square pulses L and M each have a pulse width of approximately 10 microseconds.

The output of the Inverter Comparator 55, shown as signal wave form F, is supplied to a Latch circuit 60 for producing a latch pulse K, which is a relatively square wave pulse having a leading edge corresponding to the leading edge of the applied inverter comparator pulse F and a trailing edge corresponding to the leading edge of the pulse H from the Detector Comparator which is also supplied thereto.

It will be appreciated that the latch pulse K provided by the Latch circuit 60 may be described as being in the "on"-condition from the time $t_1$ to the time $t_4$ and is supplied to the Noise Gate 61 for the purpose of controlling or gating same to the "on"-condition for passing the output signal L from the Reference Signal Conditioner 58 to a first input of the RS Flip-Flop circuit 62. A second input to the RS Flip-Flop circuit 62 is coupled to the output of the Detector Signal Conditioner 59 for receiving the square detector pulse signal M. The RS Flip-Flop circuit 62 is turned on in response to the leading edge of the squared reference pulse L and is turned off in response to the leading edge of the square detector pulse M so that it produces an output signal of the wave form N which is a square-wave positive-going pulse, the leading edge of which corresponds to the time interval $t_3$ and the trailing edge of which corresponds to the time interval $t_4$, as determined by the respective leading edges of the reference pulse L and detector pulse M which, in turn, correspond to the zero crossing points of the reference and detector sensors, respectively.

The RS flip-flop pulse N is coupled to first and second parallel isolating Buffers 63, 64, the first of which has its output coupled to an Integrator 65 which produces an integrated output voltage of the wave form O which, in turn, is supplied to a first or analog input of a Sample-and-Hold circuit 66, which functions to acquire and track the integrated voltage signal O during the time that the flip-flop pulse N is simultaneously applied to a second or logic input of Sample-and-Hold circuit 66 for gating it to the "on"-condition. Upon termination of the RS flip-flop output signal N at the second input of the Sample-and-Hold circuit 66, the latter circuit immediately ceases to sample Sample-and-Hold "track" the integrated signal O applied to its first or signal input and switches instantly to "hold" an output signal of wave form P which it transfers to an Output Amplifier 67 which, in turn, supplies the signal P to a Recorder 68. The signal P is held at the output of the Sample-and-Hold circuit 66 until the onset of the leading edge of the next flip-flop pulse produced during the next operating cycle of the apparatus, e.g., during the next rotational cycle of the reference and detector members, and which is in the wave form Q.

It is to be understood that the analog signal P is supplied by the Sample-and-Hold circuit 66 to the Output Amplifier 67, and thence to the Recorder 68, is proportional to the time interval $t_3-t_4$, representing the respective zero crossings of the reference and detector blades past the centers of their respective magnetic sensors and is therefore proportional to the deflection of the detector blade by the material in the sample chamber 11, and thus is proportional to the consistency of the material passing through the consistometer instrument. An output signal from the Recorder 68 may be supplied to a Process Controller 69 for producing appropriate signal outputs known to control the operation of a continuous grease process, e.g., in the manner shown in the aforementioned patent of Richmond, et al. A Power Supply 70 is shown diagrammatically for supplying appropriate operating potentials to the apparatus of FIG. 2.

It is to be understood that through proper manipulation of the controls for span and suppression the Recorder 68 can display an analog signal indicating the relative consistency of the medium or material in which the detector blade is immersed within the chamber 11.

Essentially, the operation of the circuit shown in the preferred embodiment of FIG. 2 for measuring the time difference between the zero crossing points of signals A and B at time intervals $t_3$ and $t_4$, respectively, functions by applying the reference and detector pulses L and M to the set and reset inputs, respectively, of the RS Flip-Flop circuit 62 in order to produce the square wave form output pulse N, the duration of which corresponds to the time interval between the leading edges of the reference pulse L and detector pulse M at time intervals $t_3$ and $t_4$, respectively.

In FIG. 2, the Noise Gate 61 provides means for preventing spurious noise from reaching the set input of the RS Flip-Flop circuit 62 and which might otherwise provide false signal indication which might be erroneously recorded as measurements of the time interval $t_3-t_4$. The Noise Gate 61 prevents this from occurring by permitting signals to reach the set input of the RS Flip-Flop 62 only during selected times when the respective blades are in the vicinity of the respective sensors, thus preventing spurious signals from reaching the set input of the RS Flip-Flop circuit during most of the operating cycle of the rotating reference and detector blades. The Noise Gate 61 is controlled by the latch pulse K from the Latch circuit 60 which may be a bistable multivibrator for providing the pulse of wave form K for opening the Noise Gate 61 only during the time determined by the leading edges of the inverter comparator pulse F and the detector comparator pulse H. The leading edge of the pulse F from the Inverter Comparator 55 corresponds to the time $t_1$ when the reference blade just begins to enter the magnetic field of the reference sensor and the leading edge of the pulse H from the Detector Comparator 54 corresponds to the time $t_4$ when the detector blade passes through the zero crossing point of the detector sensor. Thus, the latch pulse K activates the Noise Gate only during the time interval $t_1$ through $t_4$, which is the time from the arrival of the reference blade at the magnetic flux of the reference sensor until the time the detector blade crosses the magnetic center of the detector sensor.

It is to be appreciated that the consistometer alarm system comprising the present invention operates in conjunction with the Noise Gate described above, with reference to FIG. 2. Although the consistometer will function without the Noise Gate and Alarm System, the latter are desirable features.

In the operation of the consistometer circuit disclosed in FIG. 2, there are times when the Noise Gate 61 operates so smoothly that it becomes very difficult to determine when the consistometer is responding to the consistency of material, such as grease, in the Chamber 11 or whether, due to action of the Noise Gate 61, it is simply remembering its last valid sample, as indicated by the latest signal N from the RS Flip-Flop 62. Thus, in accordance with the present invention, further circuit means are provided to indicate when the signal P being transmitted to the Recorder 68 is a valid one. This further circuit, referred to as the Alarm circuit, involves the provision of means for developing an alarm signal during times when a spurious signal is presented to the input of the Noise Gate 61, based on the premise that such spurious signals occur outside the time $t_1-t_4$ when the Noise Gate 61 is maintained open, i.e., conductive, by the latch pulse K. A normal signal such as the signal L appearing on both sides of the Noise Gate 61 produces no indication by the Alarm circuit and it is assumed under those latter conditions that the consistometer is operating normally.

The Alarm circuit includes an Exclusive-OR circuit 80 having its respective input terminals 1 and 2 coupled to opposite sides of the signal path through the Noise Gate 61. In particular, the first input 1 of Exclusive-OR 80 is coupled to the output of Reference Signal Conditioner 58 for receiving the signal L at the same time that the signal L is applied to the input of the Noise Gate 61. The second input 2 of the Exclusive-OR 80 is coupled to the output of the Noise Gate 61 for receiving the signal L when the same is outputted from the Noise Gate 61 during normal operation thereof, i.e., when the signal L applied to the input of the Noise Gate 61 occurs during the time $t_1$–$t_4$ so that it is gated through to the set input of the RS Flip-Flop 62. The output of the Exclusive-OR 80 is, in turn, supplied to a first or set input of an Alarm Latch circuit 81, shown within the dashed box 81 as a bistable multivibrator (comprising elements 81A and 81B). The output of the Noise Gate 61 is likewise coupled to the second or reset input of the bistable multivibrator comprising the Alarm Latch circuit 81. The output of the Alarm Latch circuit 81 is coupled to the input of a Lamp Driver circuit 82 which, in turn, is coupled to an indicator device shown as a Lamp 83 for operating same in response to a signal therefrom when the bistable multivibrator or Alarm Latch circuit 81 has been set in response to the condition described above, namely, when a signal appears only at the input of the Noise Gate 61, i.e., at a time when no corresponding signal appears at the output thereof.

The Exclusive-OR circuit 80 produces a positive output pulse when a positive pulse is applied to either input 1 or 2 thereof but not if it is simultaneously applied to both inputs 1 and 2. Thus, when a positive pulse such as L appears at the input of Noise Gate 61 and, likewise, is supplied to the first terminal of the Exclusive-OR device 80 during a time that there is no corresponding pulse appearing at the output of the Noise Gate (which will occur when the Noise Gate 61 is gated to the "off"—or nonconducting condition by the control circuit including the Latch 60), the same pulse will thus appear only at the first terminal 1 of the Exclusive-OR circuit 80 and not at the second 2, thereby causing the latter circuit to set the Alarm Latch circuit 81, thus providing a positive output pulse from the bistable multivibrator 81 causing Alarm Latch 80 to activate the Lamp Driver 82 which, in turn, activates the Lamp 83.

When the operation of the consistometer system returns to normal with a positive signal pulse such as L gated through the Noise Gate 61 so that it appears at the output of the Noise Gate 61 as well as at the input thereof, such a normal signal pulse will also appear at the reset input of the bistable multivibrator comprising the Alarm Latch 81 and will reset it to its first condition, whence it produces no output to the Lamp Driver 82, whereupon the Lamp 83 is turned off. The Alarm circuit is thus automatically made ready to respond to further spurious pulses, should they appear at the input of the Noise Gate 61, as discussed above.

In carrying out the herein disclosed invention, a conventional magnetic pickup may be employed. For example, a suitable detector is the model 700–0941–A marketed by AIR-PAX Electronics, Seminole Division, P.O. Box 8488, Fort Lauderdale, Florida 33310.

The speed of rotation of the resilient member in the Chamber 11 may vary according to the nature of the material being measured and the length of the detector blade. For example, suitable measurements have been made using speeds in a range of 37 to 74 rpm. Depending upon the material. A typical value for grease is 52 rpm. However, this may vary according to the length of the blade.

As discussed above, a further embodiment of the present invention involves the provision of a reference member in the form of a nonmagnetic disc which may be formed of material such as brass, and which has located on the perimeter thereof a magnetic reference element which may comprise an insert such as a ferrous strip imbedded therein, and which may be formed of the same material as the resilient detector member. In one embodiment the reference member has been constructed of a brass disc having a carbon steel reference element imbedded therein. In one embodiment the carbon steel reference element had a thickness of 0.01 inch, which corresponded closely to the thickness of the resilient detector member.

It is to be understood that when the reference member is in the form of a disc, as thus described, it may be positioned on the shaft 21 outside of the chamber 11, as shown in FIG. 1, in which case the disc would replace the element 40 and should have substantially the same radial dimension as that of the resilient detector member 32. It should be noted that this is preferably the case, i.e., the reference and detector members should preferably have substantially the same radial dimension from the center of the shaft outwardly to the tip of the perimeter thereof, whether the reference member comprises a blade as shown in FIG. 1 or a disc as herein described, so that the reference member and the detector member will have the same velocity in passing their respective sensors.

In the case where the reference member is formed in the shape of a nonmagnetic disc with a magnetic insert, as described above, it may be mounted within the chamber 11 on the shaft 21, preferably above the outlet 20, as shown in FIG. 1, and the disc should have an outside diameter closely approaching the inside diameter of the chamber 11, so that the reference sensor will detect a signal therefrom which is similar to the signal obtained by the detector sensor from the reference blade member 32, subject only to difference in times of detection, as determined by the deflection of the resilient detector blade 32 in the material within the chamber 11.

The apparatus herein disclosed is capable of measuring the consistency of various materials. It is to be understood that the term "consistency" as used herein is intended broadly to include viscosity, but is not limited thereto. Thus, consistency is intended to apply to both Newtonian fluids such as water, alcohol, oil, etc., and to non-Newtonian fluids such as grease, paper pulp slurries, oil-well drilling fluids, paint, polymers, etc.

The preferred embodiment of the apparatus herein disclosed is concerned with measurement of consistency wherein the flexible detector member is rotated about an axis parallel to the direction of flow of the material being measured. It is to be understood, however, that novel aspects of the present invention may also be applied to such consistency measuring systems wherein the axis of rotation of the resilient member deviates somewhat from the direction of flow of such material. In the latter case, however, it should be appreciated that the velocity of flow and density of the material(s) comprising the stream will exert a force against the flexible member such that both the velocity of flow and density should be maintained relatively constant, or otherwise be taken into account in evaluating the consistency measurements.

We claim:

1. Apparatus for continuously measuring the consistency of a stream of material comprising a rotatable resilient detector member located in the path of said stream so that the opposite surfaces about which said member is flexible are substantially parallel to the direction of flow in said stream, means for rotating said resilient detector member at a constant rate about an axis which is parallel to the direction of flow in said stream, means for sensing the condition of flexure of said member in order to provide a measurement of the reaction forces exerted by said material on said resilient member substantially entirely in a direction normal to said direction of flow of said material, comprising a reference member, means for rotating said reference member in synchronism with said resilient member, and means for substantially continuously measuring time displacement between said reference member and said resilient member due to deflection of said resilient member by said material, thereby providing a measurement indicating the consistency of the material substantially independently of the rate of flow of said material in said stream, said means for measuring the displacement of said resilient detector member comprising means for measuring the time difference between the passage of the reference member and the resilient member past respective sensor devices, said means for measuring said time difference comprising means for producing first and second electric pulses having leading edges corresponding, respectively, to the times at which said reference and resilient members pass predetermined portions of their respective sensors, means for determining the time difference between the leading edges of the respective first and second electric pulses, means for selectively gating said first electric pulse to said means for determining said time difference between said leading edges of said first and second electric pulses only during a predetermined time when said reference and resilient members are in the vicinity of their respective sensors, and means for generating an alarm signal when a spurious signal appears at the input of said gating means outside of said predetermined time when said reference and resilient members are in the vicinity of their respective sensors.

2. Apparatus as defined in claim 1, wherein the means for determining the time difference between the leading edges of the respective first and second electric pulses comprise means for producing a third electric pulse having a time duration corresponding to the time difference between said leading edges.

3. Apparatus as defined in claim 2, comprising means for producing an analog signal whose amplitude varies in accordance with the time duration of said third electric pulse.

4. Apparatus as defined in claim 1, wherein the respective sensor devices comprise magnetic sensors.

5. Apparatus as defined in claim 2, wherein the respective sensor devices comprise magnetic sensors.

6. Apparatus as defined in claim 4, wherein the beginning points of the respective electric pulses correspond to the zero time crossings at which the respective members pass the magnetic centers of their respective magnetic sensors.

7. Apparatus as defined in claim 5, wherein the beginning points of the respective electric pulses correspond to the zero time crossings at which the respective members pass the magnetic centers of their respective magnetic sensors.

8. Apparatus as defined in claim 1, wherein said means for generating an alarm signal comprises an Exclusive-Or Circuit having an output for producing an alarm pulse, said Exclusive-Or Circuit having first and second input terminals coupled respectively to the input and output terminals of said gating means for producing an alarm pulse only when a spurious signal is applied to the input of said gating means at times outside of said predetermined time when said gating means gates said first electric pulse through its output terminal to said means for determining said time difference.

9. Apparatus as defined in claim 2, wherein said means for generating an alarm signal comprises an Exclusive-Or Circuit having an output for producing an alarm pulse, said Exclusive-Or Circuit having first and second input terminals coupled respectively to the input and output terminals of said gating means for producing an alarm pulse only when a spurious signal is applied to the input of said gating means at times outside of said predetermined time when said gating means gates said first electric pulse through its output terminal to said means for determining said time difference.

10. Apparatus as defined in claim 8 wherein said means for generating an alarm signal comprises an alarm latch circuit for producing said alarm signal and wherein said alarm latch circuit comprises a bistable multi-vibrator having a set input coupled to the output of said Exclusive-Or Circuit and a reset input coupled to said output terminal of said gating means for resetting said alarm circuit when normal signal pulses are passed through said gating means to its output terminal during said predetermined time when said reference and resilient members are in the vicinity of their respective sensors.

11. Apparatus as defined in claim 9 wherein said means for generating an alarm signal comprises an alarm latch circuit for producing said alarm signal and wherein said alarm latch circuit comprises a bistable multi-vibrator having a set input coupled to the output of said Exclusive-Or Circuit and a reset input coupled to said output terminal of said gating means for resetting said alarm circuit when normal signal pulses are passed through said gating means to its output terminal during said predetermined time when said reference and resilient members are in the vicinity of their respective sensors.

* * * * *